United States Patent
Evans

(10) Patent No.: US 7,314,508 B2
(45) Date of Patent: Jan. 1, 2008

(54) DESICCANT CARTRIDGE WITH SEAL

(75) Inventor: John M. Evans, Piqua, OH (US)

(73) Assignee: Flow Dry Technology, Inc., Washington, DC (US)

(*) Notice: Subject to any disclaimer, the term of this patent is extended or adjusted under 35 U.S.C. 154(b) by 241 days.

(21) Appl. No.: 10/524,374

(22) PCT Filed: Aug. 7, 2003

(86) PCT No.: PCT/US03/24898

§ 371 (c)(1),
(2), (4) Date: Feb. 15, 2005

(87) PCT Pub. No.: WO2004/016340

PCT Pub. Date: Feb. 26, 2004

(65) Prior Publication Data
US 2006/0065123 A1 Mar. 30, 2006

Related U.S. Application Data

(60) Provisional application No. 60/404,176, filed on Aug. 16, 2002.

(51) Int. Cl.
B01D 53/04 (2006.01)
B01D 53/26 (2006.01)

(52) U.S. Cl. .......................... 96/135; 96/147

(58) Field of Classification Search ............... 96/117.5, 96/134, 135, 137, 138, 147, 149, 151, 153; 55/502, 507, 513, 518; 210/282, 450; 62/474
See application file for complete search history.

(56) References Cited

U.S. PATENT DOCUMENTS

| | | | |
|---|---|---|---|
| 4,634,527 A | 1/1987 | Marshall | |
| 5,399,264 A * | 3/1995 | Pulek et al. | 210/450 |
| 5,522,204 A * | 6/1996 | Wood | 53/452 |
| 5,529,203 A | 6/1996 | Flaugher | |
| 5,540,348 A | 7/1996 | Wood | |
| 5,569,316 A | 10/1996 | Flaugher et al. | |
| 5,605,555 A | 2/1997 | Patel et al. | |
| 5,685,087 A | 11/1997 | Flaugher et al. | |
| 5,716,432 A | 2/1998 | Perrine | |
| 5,718,743 A * | 2/1998 | Donnelly et al. | 96/135 |
| 5,814,136 A | 9/1998 | Wood | |
| 5,858,232 A | 1/1999 | Meissner | |
| 6,168,647 B1 * | 1/2001 | Perry et al. | 95/19 |
| 6,568,540 B1 * | 5/2003 | Holzmann et al. | 210/445 |
| 6,623,549 B1 | 9/2003 | Evans et al. | |
| 2003/0079610 A1 | 5/2003 | Hayes et al. | |

FOREIGN PATENT DOCUMENTS

JP 4-203774 * 7/1992

* cited by examiner

Primary Examiner—Frank M. Lawrence
(74) Attorney, Agent, or Firm—Wegman, Hessler & Vanderburg

(57) ABSTRACT

A desiccant cartridge (10) having a seal (12) therearound for forming a proper seal between cartridge (10) and canister (14) of a receiver/dryer or accumulator assembly includes a cup (16) extending along an axis (18) having inner wall portion (20) and outer wall portion (22) connected to transverse portion (24) to define a chamber (26) containing desiccant particles (30). Cap (70) is secured to cup (16) to secure the desiccant particles (30) inside chamber (26). Outer wall portion (22) is provided with the seal (12) that is composed of a flexible thermoplastic elastomer that is resistant to heat during welding shut of the canister (14).

3 Claims, 4 Drawing Sheets

DESICCANT CARTRIDGE WITH SEAL

CROSS-REFERENCE TO RELATED APPLICATIONS

This application claims the priority filing benefit of International PCT application PCT/US2003/024898 filed Aug. 7, 2003, and published under PCT 21(2) in the English language; and U.S. Provisional Patent Application Ser. No. 60/404,176 filed Aug. 16, 2002.

FIELD OF THE INVENTION

This invention relates generally to desiccant cartridges for use in canisters of receiver/dryers or accumulator assemblies of automotive air conditioning systems. More specifically, it relates to a desiccant cartridge having a seal therearound for forming a seal between the cartridge and canister.

BACKGROUND OF THE INVENTION

Desiccant cartridges containing desiccant particles are common in automotive air conditioning systems for dehydrating refrigerants. These desiccant cartridges are adapted to fit within canisters of receiver/dryer (R/D) and accumulator assemblies.

Although various forms of R/D and accumulator assemblies have been suggested in the prior art, the types used in automotive air conditioning systems generally include an elongated canister having inlet and outlet ports communicating with the interior thereof. The outlet port may consist of a fluid flow tube used to return the air or fluid flowing from the entry end of the canister to the exit end. A desiccant cartridge holding desiccant particles is positioned in the interior of the canister allowing for air or fluid to move through the desiccant particles.

Desiccant containing cartridges such as those shown in U.S. Pat. Nos. 5,814,136; 5,716,432; 5,685,087; 5,569,316; 5,540,348; 5,529,203; and 5,522,204 are disposed in the R/D and accumulator assemblies and function to dry the liquid refrigerant as it passes from the assembly inlet through to an outlet port contained in the structure.

Some dryer canisters are welded shut after the desiccant cartridge is inserted. Notably, the heat created from the welding process can be problematic in that it may result in detrimental dimensional changes to the desiccant cartridge resulting in an improper seal between the cartridge and canister. It is important that the desiccant cartridge conform to the dimensions of the canister in order to form a secure fit within the canister and to form a proper seal between the cartridge and the canister. An improper seal can cause leakage within the receiver/dryer or accumulator assembly, or into the environment. Internal leakage can create icing within the air conditioning system, and environmental leakage can create a loss in fluid pressure as well as create potential health and environmental risks. As such, an improper seal can reduce the effectiveness of the air conditioning system.

To keep a desiccant cartridge secure within a receiver dryer or accumulator assembly and form a proper seal, desiccant cartridges have employed various retention or sealing devices. One type of sealing device used on today's desiccant cartridges includes a continuous flange, or seal, made of polypropylene plastic. The seal is provided on the outer wall of the desiccant cartridge and is intended to provide a seal between the cartridge and the canister. However, the polypropylene is somewhat rigid such that the seal can be damaged when the desiccant cartridge is installed in a canister thereby creating an improper seal. Also, the polypropylene has a tendency to curl and harden from heat during welding shut of the canister resulting in detrimental dimensional changes to the seal.

Notably, the desiccant cartridge of the present invention includes a seal of high heat resistance and excellent flexibility thereby avoiding detrimental dimensional changes to the seal and improper sealing between the cartridge and the canister. This seal preferably is a thermoplastic elastomer, most preferably SANTOPRENE®.

SUMMARY OF THE INVENTION

These drawbacks and others are overcome by means of the present invention embodied in a desiccant containing cartridge.

The desiccant cartridge of the present invention includes a cup extending along an axis and having spaced inner and outer wall portions connected by a transverse portion to define a chamber having an opening. The inner wall portion defines an elongated center tube with opposing first and second ends wherein the first end extends beyond an upper edge of the outer wall and the second end extends away from a bottom surface of the transverse portion. The outer wall portion has an outer surface defining an outer diameter and a seal therearound intermediate the opening and transverse portion for cooperating with a canister to form a proper seal between the cartridge and the canister.

The seal is preferably comprised of a thermoplastic elastomer, most preferably SANTOPRENE®, which is available from Advanced Elastomer Systems, L.L.P., located in the U.S. in Akron, Ohio and Auburn Hills, Mich. The SANTOPRENE® product is superior to today's polypropylene flanges, or seals, insofar as the SANTOPRENE® provides greater heat resistance and flexibility. Specifically, SANTOPRENE® offers a constant service temperature range (−81 F to 275 F) with no cracking or tackiness; has excellent resistance to cut growth while flexing; has high tear strength and superior resistance to fatigue; and a wide range of flexibility, among other favorable characteristics.

The seal includes a continuous body, preferably annular in shape, having opposing first and second longitudinal side edges and an inner surface defining an inner diameter. The seal further includes a lip extending outwardly from the body. Preferably, the lip extends outwardly from one of the side edges and in a direction towards the opposite side edge such that a cross-section of the seal reveals a substantially v-shape. The seal preferably is removably detachable from the cartridge. The inner diameter of the seal is less than the outer diameter of the cartridge in order to create a stretch fit for the seal around the outer surface of the outer wall portion. The seal preferably is positioned around the outer wall portion of the cartridge such that the body is situated adjacent the outer surface and the lip extends outwardly from the body and away from the cartridge in a direction, preferably, towards the opening.

A cap is provided for receipt in the chamber and is secured to the cup to retain desiccant inside the chamber. Both the cap and the transverse portion are perforated to allow air or fluid to reach the desiccant housed therein.

Accordingly, the desiccant cartridge of the present invention is designed to be used in combination with a R/D or accumulator canister including an outer wall axially disposed. The canister further has a bottom wall cooperating with the outer wall to define a chamber having an opening. The canister further is provided with a lid having an outlet port therein, preferably centrally located. During assembly the lid is secured, preferably by welding, to the canister opposite the bottom wall to seal the chamber.

Prior to placing and welding the top wall onto the canister to complete assembly of the R/D or accumulator, an assembled desiccant cartridge, preferably having a SANTOPRENE® seal, is placed within the chamber so that the seal cooperates with the inner surface of the dryer canister forming a proper seal therebetween.

Accordingly, it is one object of the invention to provide a desiccant cartridge including a seal of high heat resistance and excellent flexibility thereby avoiding detrimental dimensional changes to the seal and improper sealing between the cartridge and the canister.

Also, it is another object of the invention to provide a universal size cartridge having such a seal so that the cartridge will be adapted to fit substantially all of the commercially available accumulator and receiver/dryer canisters.

Lastly, it is another object of the invention to allow customers to purchase just one size desiccant cartridge provided with such a seal so that the cartridge can fit a broad range of canister sizes.

The invention will be further described in conjunction with the appended drawings and the following detailed description.

DETAILED DESCRIPTION OF THE PREFERRED EMBODIMENT

FIGS. 1-5 illustrate the desiccant cartridge 10 of the present invention having a seal 12 therearound for forming a proper seal between the desiccant cartridge 10 and a canister 14 of a R/D or accumulator assembly (not shown).

Figure 1:
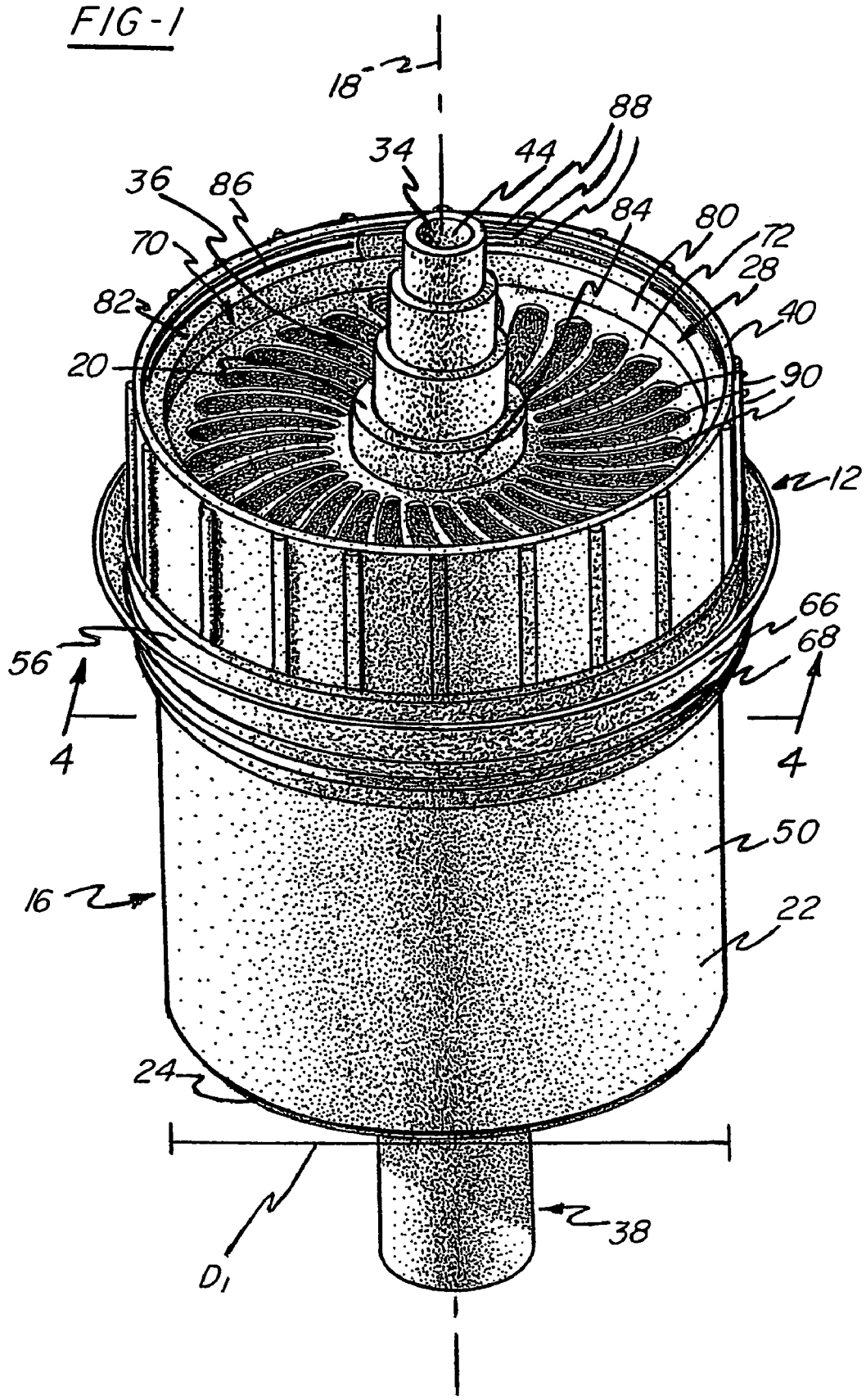
FIG. 1 is a perspective view of the desiccant cartridge of the present invention.
Figure 4:
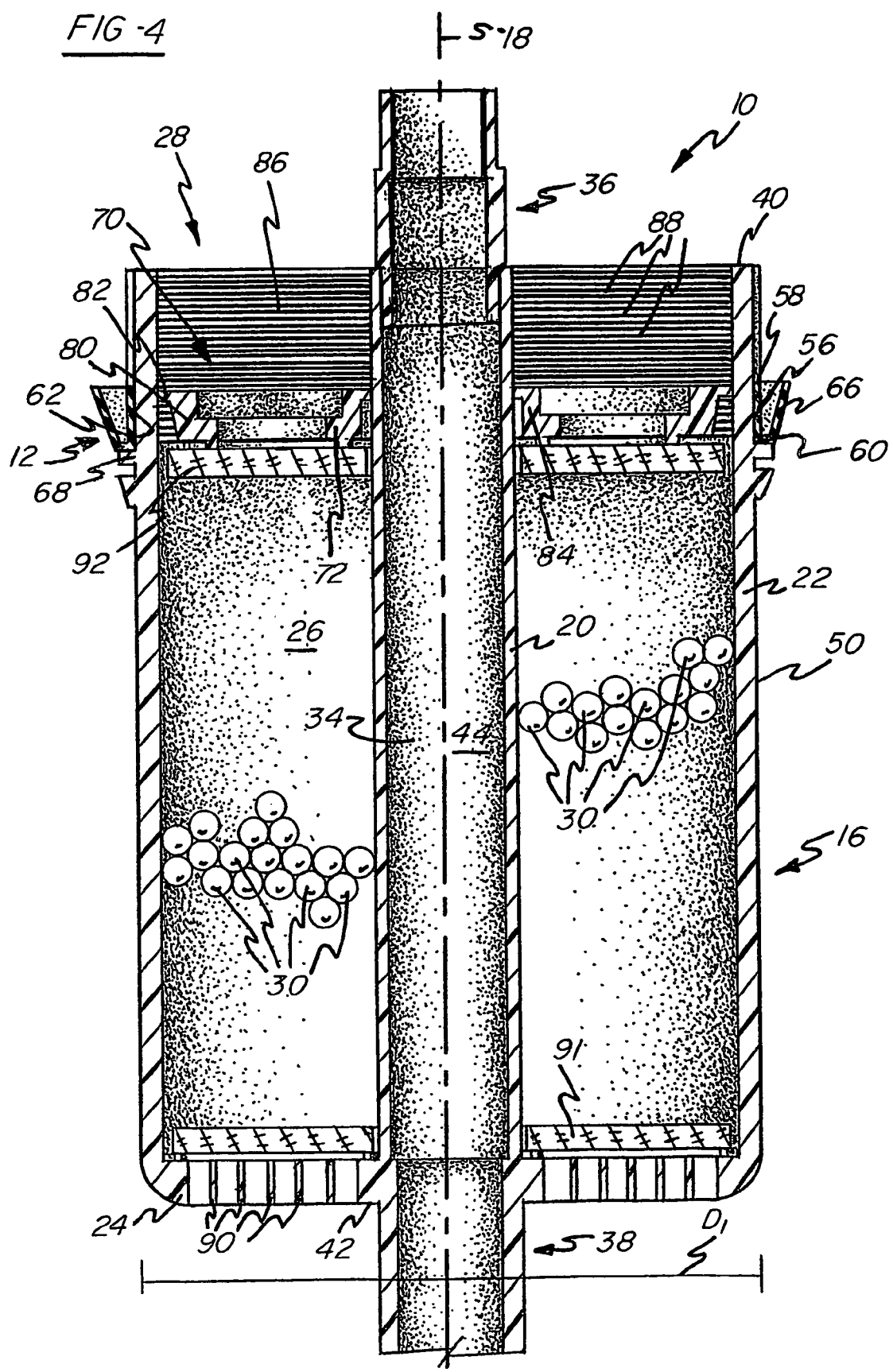
FIG. 4 is a cross-sectional view of the desiccant cartridge of FIG. 1 taken along lines 4-4.

In FIGS. 1 and 4, the desiccant cartridge 10 includes a cup 16 extending along an axis 18 and has spaced inner and outer wall portions 20 and 22 connected by a transverse portion 24 to define a chamber 26 (FIG. 4) having an opening 28 for receiving desiccant particles 30 (FIG. 4). The cup 16 is a one-piece plastic molding preferably formed from polypropylene by conventional molding techniques, although polyester may also be mentioned as another polymer that may be used. FIG. 4 shows that a leak detection dye 32 in the form of a wafer, or the like, may also be placed within the chamber 26. The dye wafer 32 is used to identify leaks in the air conditioning system (not shown).

As best shown in FIG. 4, the inner wall portion 20 defines an elongated center tube 34 with opposing first and second ends 36 and 38 wherein the first end 36 extends beyond an upper edge 40 of the outer wall 22 and the second end 38 extends away from a bottom surface 42 of the transverse portion 24 thereby providing a simple way for replacing a metal fluid flow tube (not shown) while at the same time reducing the material, manufacturing, handling and assembly costs associated therewith. The first end 36 preferably is formed from a high temperature resistant plastic, such as a polypropylene/nylon blend. Here, the first end 36 has been molded separately from the cup 16 then press fit to the inner wall portion 20 opposite the second end 38 to form a center tube 44 such that the first end 36 comprises a high temperature resistant plastic.

Figure 5:
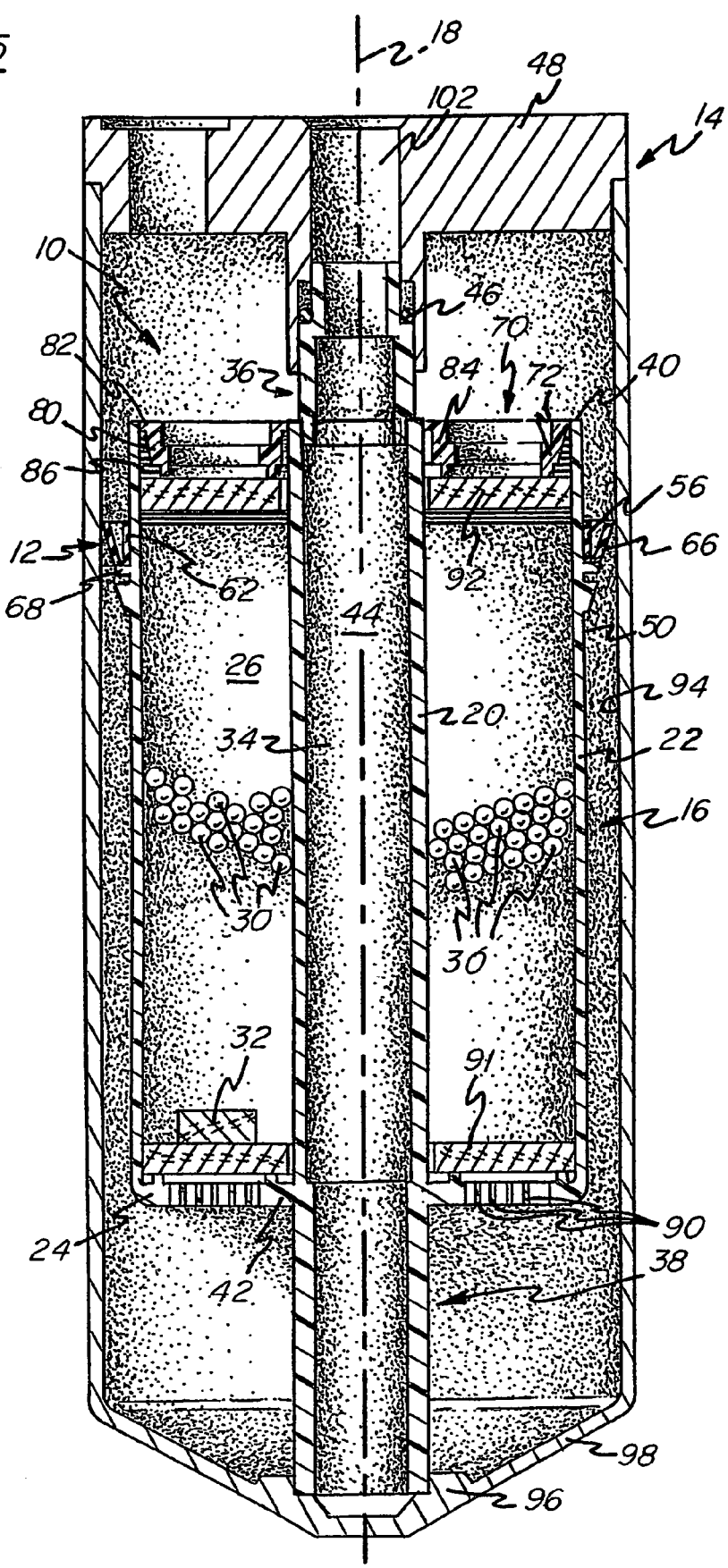
FIG. 5 is a cross-sectional view of the desiccant cartridge of FIG. 1 installed in a canister of a R/D or accumulator assembly.

As shown in FIG. 5, the first end 36 is shaped to receive a temperature resistant o-ring 46 to further protect and insulate the first end 36 from heat during welding of a lid 48 onto the canister 14. The high temperature o-ring 46 preferably is made from a high temperature HNBR rubber material available from Parker.

In FIG. 1, the outer wall portion 22 of the cartridge 10 has an outer surface 50 defining an outer diameter (D1) and a seal 12 therearound intermediate the opening 28 and the transverse portion 24 for cooperating with the canister 14 (FIG. 5) to form a proper seal between the cartridge 10 and the canister 14 (FIG. 5).

The seal 12 is preferably comprised of a thermoplastic elastomer, most preferably SANTOPRENE®, which is available from Advanced Elastomer Systems, L.L.P., located in the U.S. in Akron, Ohio and Auburn Hills, Mich. The SANTOPRENE® product is superior to today's polypropylene flanges, or seals, insofar as the SANTOPRENE® provides a higher heat resistance to welding and a greater flexibility which allows the seal 54 to deflect but still maintain a proper seal. Specifically, SANTOPRENE® offers a constant service temperature range (−81° F. to 275° F.) with no cracking or tackiness; has excellent resistance to cut growth while flexing; has high tear strength and superior resistance to fatigue; and a wide range of flexibility, among other favorable characteristics.

Figure 2:
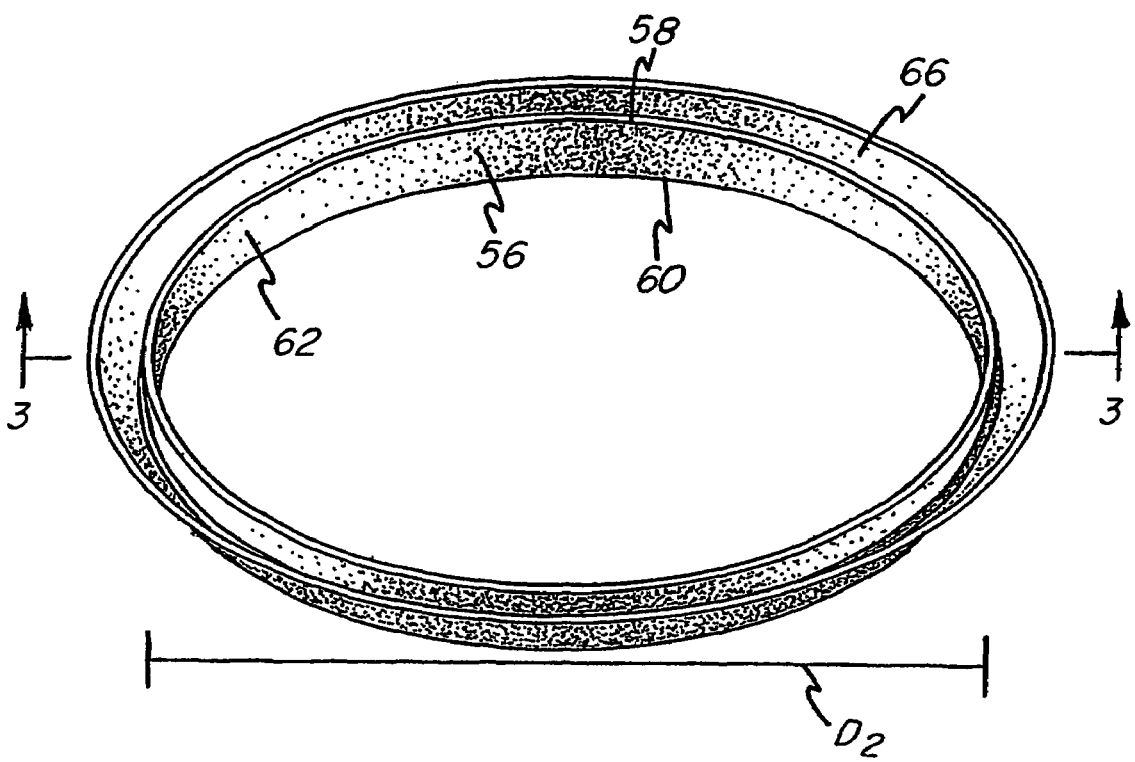
FIG. 2 is a perspective view of the seal of the present invention.
Figure 3:
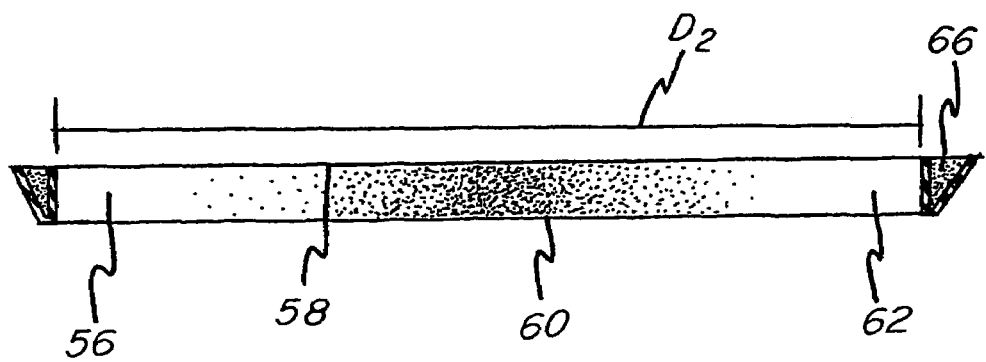
FIG. 3 is a cross-sectional view of the seal of FIG. 2 taken along lines 3-3.

As best shown in FIGS. 2 and 3, the seal 12 includes a continuous body 56, preferably annular in shape, having opposing first and second longitudinal side edges 58 and 60 and an inner surface 62 defining an inner diameter (D2). The seal 12 further includes a lip 66 extending outwardly from the body 56. Preferably, the lip 66 extends outwardly from one of the side edges 58 and in a direction towards the opposite side edge 60 such that a cross-section of the seal 12 reveals a substantially v-shape. The lip 66 of the seal 12 is adapted to resiliently fit, by a friction or interference fit, within the canister 14 (FIG. 5) of an air conditioning or refrigeration system (not shown). This resilience, or flexibility, of the lip 66 allows for compensations for the variations in diameters of canisters 14 such that a cartridge 10 can be sized from one mold (not shown). The seal 12 preferably is removably detachable from the cartridge 10 (FIG. 1). Notably, the inner diameter (D2) of the seal 12 is less than the outer diameter (D1) (FIG. 1) of the cartridge 10 (FIG. 1) in order to create a stretch fit for the seal 12 around the outer surface 50 (FIG. 1) of the outer wall portion 22 (FIG. 1).

As shown in FIG. 4, the seal 12 preferably is positioned around the outer wall portion 22 of the cartridge 10 such that the body 56 is situated adjacent the outer surface 50 and the lip 66 extends outwardly from the body 56 and away from the cartridge 10 in a direction towards the opening 28 thereof. The artisan will appreciate that the seal 12 can comprise a multiplicity of various dimensions and still conform to the cup 16 such that it is secured therearound.

As best shown in FIG. 4, the outer wall portion 22 includes a seal stop 68 which protrudes outwardly from the outer surface 50 of the outer wall portion 22 intermediate the opening 28 and the transverse portion 24 for limiting axial movement of the seal 12 along the outer surface 50. The seal 12 preferably is positioned intermediate the seal stop 68 and the opening 28.

In FIGS. 1 and 4, a cap 70 conforms to the circular shape of the cup 16 and has a planar portion 72 having an outer and inner circumference defining an aperture for receiving the inner wall portion 20 when the cap 70 is received in the chamber 26. The cap 70 further is provided with a peripheral flanged portion 80 extending transversely from the outer circumference of the planar portion 72 and having a continuous edge portion 82 which cooperates with the outer wall portion 22 to retain the cap 70 to the cup 16. A central flanged portion 84 extends transversely from the inner circumference of the planar portion 72 which cooperates with the inner wall portion 20 to further aid in retaining the cap 70. The artisan will appreciate that the cap 70 can comprise a multiplicity of various features and dimensions and still conform to the cup 16 such that it is secured thereto.

Additionally, as best shown in FIG. 4, an inner surface 86 of the outer wall portion 22 of the cup 70 may include a plurality of inner surface protrusions 88 including, but not limited to, ribs, nibs, beads, bumps or other equivalent protrusions projecting radially inwardly from the outer wall portion 22 which engage and retain the cap 70 in one of a number of axially spaced positions.

As shown in FIGS. 1 and 4, the transverse portion 24 of the cup 16 (FIG. 4) and the cap 70 (FIG. 1) are each perforated with a number of ports 90 or perforations so that the cap 70 (FIG. 1) and the transverse portion 24 (FIG. 4) are each permeable to the air or fluid (not shown) to be dried. As shown in FIG. 1, the cap 70 is provided with a multiplicity of oblong, petal shaped ports 90 generally disposed with their major axes radially extending from the center tube 44 (FIG. 4) toward the outer circumference of the cap 70. The ports 90 of the cap 70 and transverse portion 24 (FIG. 4) preferably are arranged in one concentric annular row. The precise arrangement and shapes of the ports 90 is not critical to the operation of the desiccant cartridge 10 as long as the desiccant 30 (FIG. 4) remains contained and air or fluid (not shown) is allowed to enter the cartridge 10, interact evenly with the desiccant 30 (FIG. 4), and exit from the cartridge 10.

As shown in FIG. 4, plies of a permeable lining material 91 and 92, such as felted polyester or gauze can be placed inside the chamber 26 near the transverse portion 24 and the cap 70 to trap the desiccant 30 in the cartridge 10. The plies 91, 92 must be permeable to the air or fluid (not shown) to be dried but impermeable to the particulate desiccant 30.

As best seen in FIG. 4, to assemble the desiccant cartridge 10, the first ply of permeable lining material 91 is inserted by sliding it down the inner wall portion 20 until positioned adjacent the transverse portion 24. Then, the required amount of desiccant 30 is poured therein. The desiccant material 30 comprises beads that are commercially available from Universal Oil Products under the XH7 designation. A dye wafer 32 (FIG. 5) also may be placed into the chamber 26. Once the desiccant 30 is charged, the second ply of the permeable lining material 92 can be slid down the inner wall portion 20 against the desiccant 30. The cap 70 is then inserted into the chamber 26 and urged downwardly toward the transverse portion 24 until it abuts against the charged desiccant 30.

The seal 12, preferably comprising SANTOPRENE®, can be stretch fit around the outer wall portion 22 of the cartridge 10 any time during assembly, preferably, prior to insertion of the cartridge 10 into the canister 14 (FIG. 5). The seal 12 is positioned intermediate the opening 28 and the transverse portion 24 and adjacent the seal stop 68. The body 56 of the seal 12 is situated adjacent the outer surface 50 and the lip 66 extends outwardly from the body 56 and away from the cartridge 10, preferably, in a direction towards the opening 28.

Once the desiccant cartridge 10 is assembled, it is inserted into the canister 14 as shown in FIG. 5. The cartridge 10 may be vibrator or bowl fed to a robotic arm (not shown) for automatic installation into the canister 14. The seal 12 cooperates with an inner surface 94 of the canister 14 thereby forming a proper seal therebetween while the second end 38 of the tube 44 communicates with a mounting flange 96 that is spaced above a bottom wall 98 of the canister 14 to support the cartridge 10. When the lid 48 is placed onto the canister 14, the center tube 44 aligns with an outlet port 102 such that the first end 36 of the tube 44 is in communication therewith. The desiccant cartridge 10 now is properly secured within the canister 14 such that it does not move up and down or allow air or fluid (not shown) to leak.

Various changes or modifications in the invention described may occur to those skilled in the art without departing from the true spirit or scope of the invention. The above description of preferred embodiments of the invention is intended to be illustrative and not limiting, and it is not intended that the invention be restricted thereto but that it be limited only by the true spirit and scope of the appended claims.

The invention claimed is:

1. A desiccant cup comprising:
an outer wall portion of defined length connected by a transverse portion to define a chamber having an opening, said outer wall portion including an outer surface having a first diameter ($D_1$) dimension, said first diameter ($D_1$) dimension being relatively constant along the length of said outer wall portion, said outer wall portion including a stop member positioned along said length and extending outwardly from said first diameter $D_1$ dimension and a seal removably mounted over said outer surface of said outer wall portion and located intermediate said opening and said transverse portion for cooperating with a canister to form a seal therebetween, said seal comprising a thermoplastic elastomer and having a body and a lip, said seal being stretch fit around said outer surface and positioned atop said stop member with said body disposed in contiguous relation with said outer surface at a portion of said outer surface having said first diameter $D_1$ dimension and with said lip extending outwardly away from said outer surface.

2. The desiccant cup as recited in claim 1 in combination with a cap abutting said outer wall portion at said opening.

3. The desiccant cup as recited in claim 2 wherein said cap has a plurality of openings therein.

* * * * *